United States Patent
Ko et al.

(10) Patent No.: US 11,488,199 B2
(45) Date of Patent: Nov. 1, 2022

(54) DISPLAY SYSTEM FOR CALCULATING ADVERTISING COSTS

(71) Applicant: SAMSUNG ELECTRONICS CO., LTD., Suwon-si (KR)

(72) Inventors: Changgun Ko, Suwon-si (KR); Anupam Khandelwal, Suwon-si (KR); Hyunsuk Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 16/726,362

(22) Filed: Dec. 24, 2019

(65) Prior Publication Data
US 2020/0211049 A1    Jul. 2, 2020

(30) Foreign Application Priority Data
Dec. 26, 2018  (KR) .......................... 10-2018-0169435

(51) Int. Cl.
*G06Q 30/00* (2012.01)
*G06Q 30/02* (2012.01)
(Continued)

(52) U.S. Cl.
CPC ..... *G06Q 30/0244* (2013.01); *G06Q 30/0272* (2013.01); *G06T 3/4092* (2013.01); *H04L 67/04* (2013.01); *H04L 67/60* (2022.05)

(58) Field of Classification Search
None
See application file for complete search history.

(56) References Cited

U.S. PATENT DOCUMENTS

| 4,845,645 A | * | 7/1989 | Matin | ...................... G09G 1/00 |
| | | | | 715/781 |
| 6,606,744 B1 | * | 8/2003 | Mikurak | ................. H04L 29/06 |
| | | | | 717/174 |

(Continued)

FOREIGN PATENT DOCUMENTS

| JP | 2007219858 A | * | 8/2007 | ............. G06F 21/64 |
| JP | 2013050876 A | * | 3/2013 | ............. G06Q 30/02 |

(Continued)

OTHER PUBLICATIONS

• Digital Signage Today.com. Measurement and Analysis for Digital Signage. (Apr. 30, 2014). Retrieved online Jun. 26, 2021. https://digitalplacesolutions.com/wp-content/uploads/2014/04/NS_G_Measurement-and-Analysis1.pdf (Year: 2014).*

(Continued)

*Primary Examiner* — James A Reagan
(74) *Attorney, Agent, or Firm* — Staas & Halsey LLP

(57) ABSTRACT

A display system may include a display, a first server transmitting first content to the display device, a second server receiving the first content from the first server, and a camera transmitting second content obtained by capturing images on the display, to the second server. The second server may be configured to determine whether a rate at which the first content coincides with the second content is greater than or equal to a specified value, by comparing the first content with the second content. The second server measures a first time period during which a region of the captured images corresponding to the first content coincides with the second content at a rate which is greater than or equal to the specified value. Advertising costs are calculated based on the measured first time period.

17 Claims, 9 Drawing Sheets

(51) Int. Cl.
*H04L 67/04* (2022.01)
*G06T 3/40* (2006.01)
*H04L 67/60* (2022.01)

(56) References Cited

U.S. PATENT DOCUMENTS

| | | | | |
|---|---|---|---|---|
| 8,365,213 | B1* | 1/2013 | Orlowski | G06Q 30/0251 725/15 |
| 9,124,650 | B2* | 9/2015 | Maharajh | H04L 65/602 |
| 9,665,890 | B1* | 5/2017 | Kent | G06Q 30/0272 |
| 9,742,576 | B2* | 8/2017 | Hyun | H04L 9/3247 |
| 9,852,176 | B2* | 12/2017 | Montana | G06F 16/282 |
| 10,089,533 | B2* | 10/2018 | Katz | G06Q 30/0275 |
| 10,224,027 | B2* | 3/2019 | Miller | G06F 16/48 |
| 10,492,883 | B2* | 12/2019 | Kozuka | A61B 6/463 |
| 10,754,849 | B2* | 8/2020 | Montana | G06F 16/282 |
| 10,796,333 | B1* | 10/2020 | Parekh | H04L 65/611 |
| 2005/0021396 | A1* | 1/2005 | Pearch | G06Q 30/0273 705/14.69 |
| 2008/0097824 | A1* | 4/2008 | Julien | G06Q 30/0241 705/14.61 |
| 2008/0147488 | A1* | 6/2008 | Tunick | G06Q 30/0273 382/209 |
| 2010/0045681 | A1* | 2/2010 | Weissmueller, Jr. | G06Q 30/0241 345/501 |
| 2010/0223114 | A1* | 9/2010 | Yao | G06Q 40/12 705/14.12 |
| 2011/0123062 | A1* | 5/2011 | Hilu | G06Q 30/02 382/100 |
| 2011/0225417 | A1* | 9/2011 | Maharajh | H04L 65/4076 713/150 |
| 2011/0231242 | A1* | 9/2011 | Dilling | G06Q 30/0275 705/14.42 |
| 2011/0279458 | A1* | 11/2011 | Gnanasambandam | G06Q 30/08 345/440 |
| 2011/0307321 | A1* | 12/2011 | Tangney | H04L 43/045 705/14.41 |
| 2012/0179752 | A1* | 7/2012 | Mosley | G06F 16/951 709/204 |
| 2012/0303447 | A1* | 11/2012 | Hughes | G06Q 30/0255 705/14.69 |
| 2013/0030908 | A1* | 1/2013 | Gessner | G06Q 30/0277 705/14.45 |
| 2013/0085837 | A1* | 4/2013 | Blume | G06Q 30/0241 705/14.41 |
| 2013/0132170 | A1* | 5/2013 | Yelisetti | G06Q 30/02 705/14.4 |
| 2013/0138503 | A1* | 5/2013 | Brown | G06Q 30/0203 705/14.45 |
| 2013/0156304 | A1 | 6/2013 | Moorty et al. | |
| 2013/0305273 | A1* | 11/2013 | Hadfield | G06Q 30/0246 725/14 |
| 2013/0325586 | A1 | 12/2013 | Oki | |
| 2013/0339992 | A1 | 12/2013 | Oki | |
| 2014/0067525 | A1* | 3/2014 | Soupliotis | G06Q 30/0273 705/14.45 |
| 2014/0081767 | A1* | 3/2014 | Zhang | G06Q 30/0241 705/14.66 |
| 2014/0136343 | A1* | 5/2014 | Ringdahl | G06Q 30/0273 705/14.71 |
| 2014/0152786 | A1* | 6/2014 | Nicholson | H04N 21/44008 348/61 |
| 2016/0128795 | A1* | 5/2016 | Kozuka | G16H 30/20 715/771 |
| 2018/0129551 | A1* | 5/2018 | Lee | H04N 21/2223 |
| 2018/0260933 | A1 | 9/2018 | Son et al. | |
| 2020/0258209 | A1* | 8/2020 | Ko | G06F 3/1446 |
| 2020/0410549 | A1* | 12/2020 | Buchalter | G06Q 30/0246 |

FOREIGN PATENT DOCUMENTS

| | | | |
|---|---|---|---|
| JP | 2015-171051 | 9/2015 | |
| KR | 10-2010-0091763 | 8/2010 | |
| WO | WO-2007072468 A1 * | 6/2007 | G06F 21/645 |
| WO | 2012/001048 | 1/2012 | |
| WO | 2014/042473 | 3/2014 | |

OTHER PUBLICATIONS

• Cisco. Cisco Vision Dynamic Signage Director. (Nov. 15, 2017). Retrieved online Feb. 1, 2022. https://www.cisco.com/c/dam/en_us/solutions/industries/docs/sports/vison-dynamic-signage-director-datasheet.pdf (Year: 2017).*
• Cisco. Cisco StadiumVision Director. (Mar. 21, 2015). Retrieved online Feb. 1, 2022. https://www.cisco.com/c/dam/en_us/solutions/industries/docs/sports/StadiumVision_Director_Datasheet.pdf (Year: 2015).*
International Search Report dated Apr. 10, 2020 from International Application No. PCT/KR2019/018336, 3 pages.
Extended European Search Report dated Nov. 25, 2021 from European Application No. 19901864.9.
Bovik A C et al: "Image Quality Assessment: From Error Visibility to Structural Similarity", IEEE Transactions On Image Processing, IEEE, USA, vol. 13, No. 4, Apr. 13, 2004 (Apr. 13, 2004), pp. 600-612, XP011110418 **.

* cited by examiner

DISPLAY SYSTEM FOR CALCULATING ADVERTISING COSTS

CROSS-REFERENCE TO RELATED APPLICATIONS

This application is based on and claims priority under 35 U.S.C. § 119 to Korean Patent Application No. 10-2018-0169435, filed on Dec. 26, 2018, in the Korean Intellectual Property Office, the disclosure of which is incorporated by reference herein its entirety.

TECHNICAL FIELD

Embodiments of the disclosure relates to a technology for accurately calculating advertising costs.

BACKGROUND ART

With the development of the technology for producing large-sized displays (e.g. electronic display boards), the number of large-sized displays installed in a stadium, the rooftop of a building, or the like is also increasing. Spectators or citizens may naturally watch advertisements through the large-sized displays installed in a stadium, the rooftop of a building, or the like, and content providers may obtain profits from an advertisement.

DISCLOSURE

Technical Problem

In the case of a large-sized display, the maintenance cost as well as the installation cost may be very high due to the size of the large-sized display.

Stadium operators or building renters may cover the installation and maintenance costs of the large-sized display by obtaining advertising costs from content providers.

However, the large-sized display measures an advertisement playing time based on meta data and log-on information, and thus the large-sized display may consider the time, in which the advertisement is not actually displayed, as the advertisement playing time and then may calculate advertising costs, even though the advertisement is not actually displayed. For example, even though the large-sized display is defective or an error occurs in advertising data, the large-sized display may consider that an advertisement is being displayed and may calculate advertising costs. As such, the advertising costs may increase, and the content providers may spend unnecessary advertising costs.

Embodiments disclosed in this specification are intended to provide the display system for solving the above-described problem and problems brought up in this specification.

Technical Solution

According to an embodiment disclosed in the specification, a display system may include a display device, a first server transmitting first content to the display device, a second server receiving the first content from the first server, and a photographing device transmitting second content obtained by capturing the display device, to the second server. The second server may be configured to determine whether a rate at which the first content coincides with the second content is not less than a specified value, by comparing the first content with the second content, to measure a first time when a region where a rate at which the first content coincides with the second content is not less than the specified value is displayed through the display device, and to calculate advertising costs based on the first time to display the advertising costs through a display included in the first server or the second server.

According to an embodiment disclosed in the specification, a server may include a display, a communication circuit receiving first content from an external server, a memory storing the first content, and a processor operatively connected to the display, the communication circuit, and the memory. The processor may be configured to determine whether a rate at which the first content coincides with the second content is not less than a specified value, by comparing the first content with the second content when the communication circuit receives second content, which is obtained by an external photographing device by capturing an external display device, from the external photographing device, to measure a first time when a region where a rate at which the first content coincides with the second content is not less than the specified value is displayed through the external display device, and to calculate advertising costs based on the first time to display the advertising costs through the display.

According to an embodiment disclosed in the specification, a method of calculating advertising costs may include receiving first content from a server, receiving second content obtained by a photographing device by capturing a display device, determining whether a rate at which the first content coincides with the second content is not less than a specified value, by comparing the first content with the second content, measuring a first time when a region where a rate at which the first content coincides with the second content is not less than the specified value is displayed through the display device, and calculating advertising costs based on the first time to display the advertising costs.

Advantageous Effects

According to embodiments disclosed in the specification, it is possible to accurately calculate advertising costs.

Besides, a variety of effects directly or indirectly understood through the disclosure may be provided.

MODE FOR INVENTION

Figure 1:
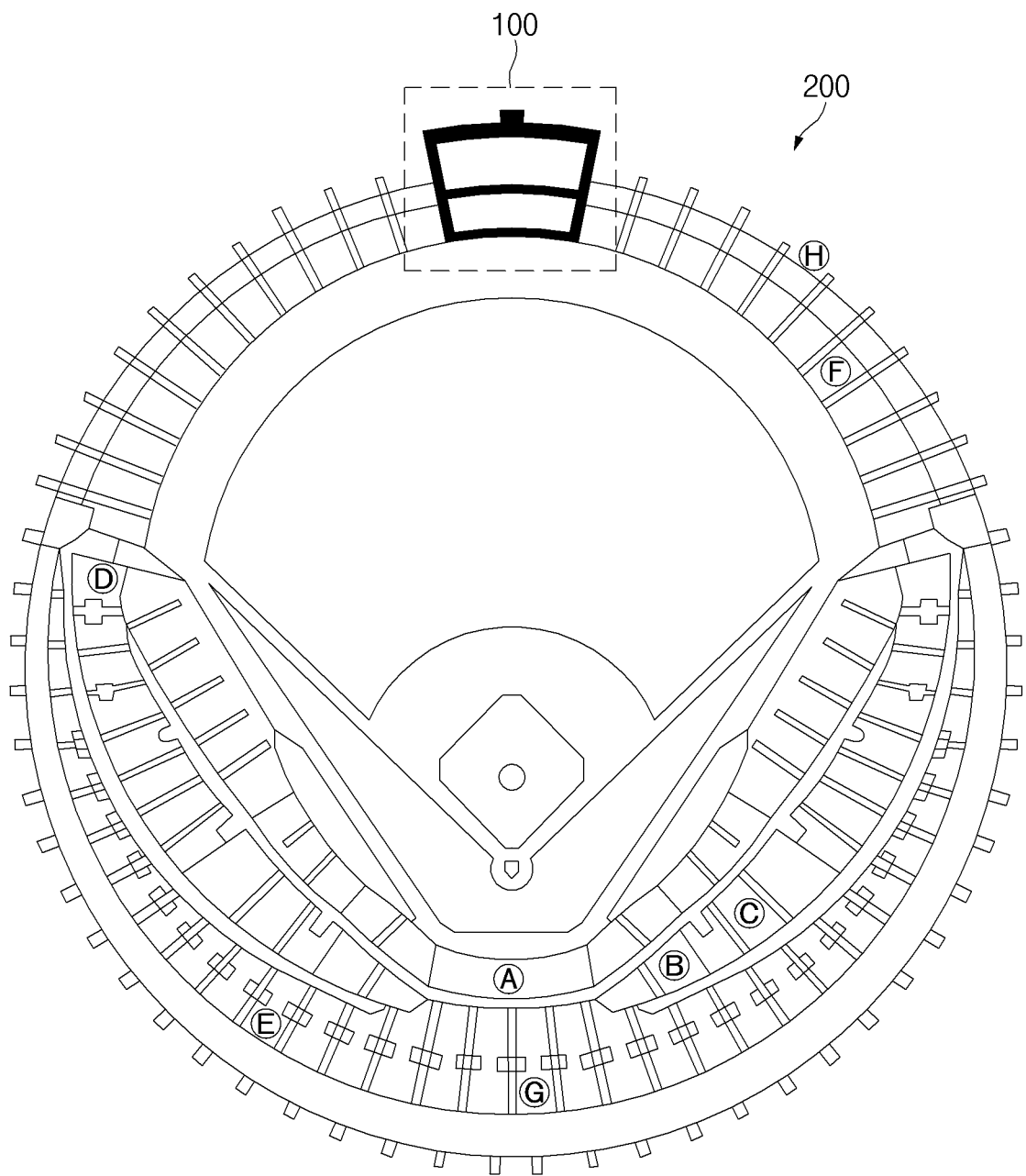
FIG. 1 illustrates an operating environment of a display system, according to an embodiment.

Hereinafter, various embodiments of the disclosure will be described with reference to accompanying drawings.

However, it should be understood that the disclosure is not intended to be limited to a specific embodiment, but intended to include various modifications, equivalents, and/or alternatives of the corresponding embodiment. With regard to the description of drawings, similar components may be marked by similar reference numerals.

FIG. 1 illustrates an operating environment of a display system, according to an embodiment.

Referring to FIG. 1, a display system 100 may be positioned in an opened space such as a stadium 200. An embodiment is exemplified in FIG. 1 as the display system 100 is positioned in the stadium 200. However, the display system 100 may be positioned on the rooftop of a building, a theater, and the like in addition to the stadium 200.

According to an embodiment, the display system 100 may display an advertisement. For example, when the display system 100 is positioned in the baseball stadium 200, the display system 100 may display scores during a match or game and may display the advertisement between innings, for example. As the display system 100 displays the advertisement, spectators may naturally watch the advertisement, and content operators may obtain huge advertising effects. In the meantime, stadium operators may generate operational benefits by receiving advertising costs from the content providers.

The display system according to the compared example may measure an advertisement playing time based on meta data, or the like. However, when the advertisement playing time is measured based on meta data or the like, an error may exist in the measured advertisement playing time. For example, even though the advertisement is not actually played due to an error in the display system or the like, the time during which the advertisement is not played may be also included in the advertisement playing time. As such, the advertising costs may increase, and the content providers may spend unnecessary advertising costs.

The display system 100 disclosed in the specification may accurately measure the advertisement playing time. For example, the display system 100 may compare the first content provided by a content provider with second content actually captured by the display system 100. When the comparison result indicates that the rate at which the first content coincides with the second content is not less than a specified value, the display system 100 may include the time when the first content is displayed, in the advertisement playing time. When the rate at which the first content coincides with the second content is less than the specified value, the display system 100 may exclude the time when the first content is displayed, from the advertisement playing time. As such, the display system 100 may accurately calculate the advertising costs and the content provider may save unnecessary advertising costs.

Figure 2:
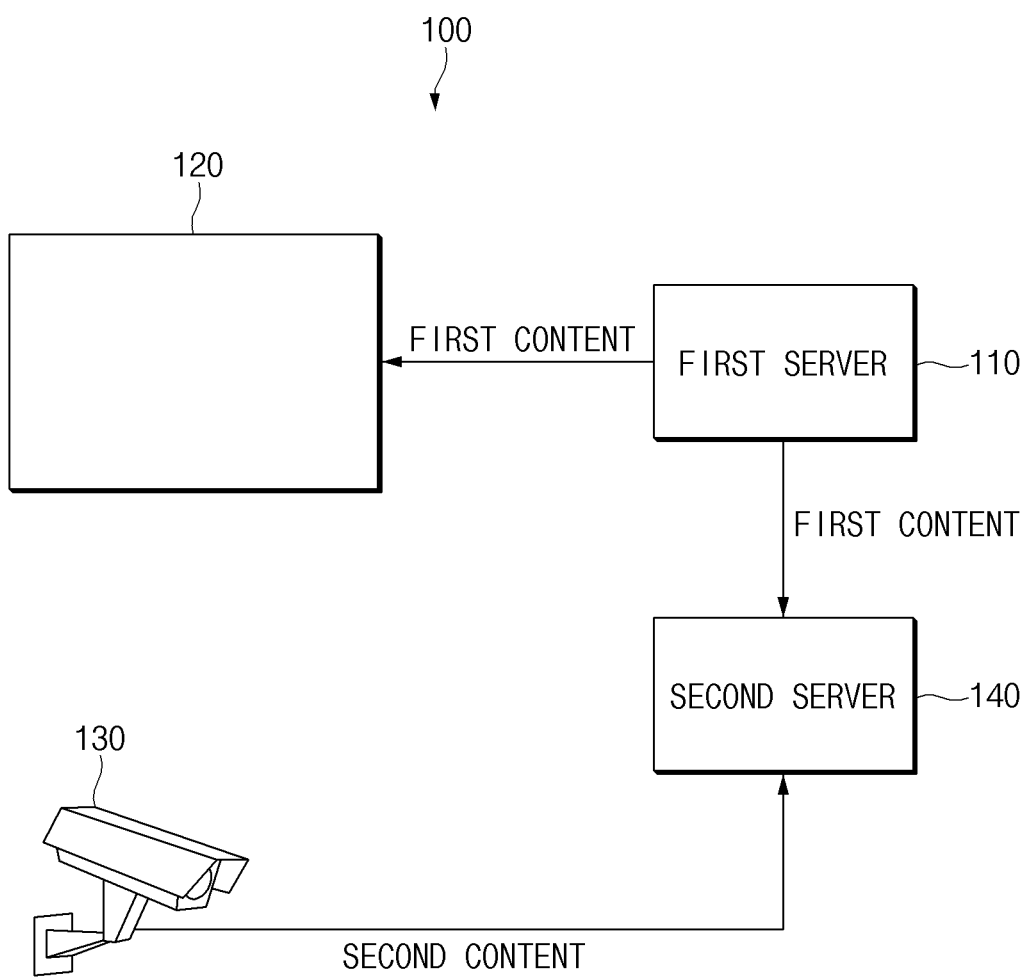
FIG. 2 illustrates a block diagram of a display system, according to an embodiment.

FIG. 2 illustrates a block diagram of a display system, according to an embodiment. FIG. 2 is a block diagram of hardware components included in the display system 100 illustrated in FIG. 1.

Referring to FIG. 2, the display system 100 may include a first server 110, a display device 120, a photographing device 130, and a second server 140. An embodiment is exemplified in FIG. 2 as the first server 110 is distinguished from the second server 140. However, the first server 110 and the second server 140 may be a single configuration. Furthermore, various embodiments disclosed in the specification may not include a part of the components illustrated in FIG. 2 or may further include components not illustrated in FIG. 2.

The first server 110 may be connected to the display device 120 by wire or wirelessly. The first server 110 may be positioned together with the display device 120 or may exist in the form of a cloud server.

According to an embodiment, the first server 110 may transmit first content to the display device 120. The first content may refer to the content provided by a content provider, and may mean, for example, original data or advertisement data.

The display device 120 may display the first content received from the first server 110. When there is no error in the display device 120 or the first content, the first content as it is may be displayed through the display device 120. However, when there is an error in the display device 120 or the first content, the content different from the first content may be displayed. For example, the part of the advertisement screen may be missing or the advertisement may not be played.

The photographing device 130 may transmit second content to the second server 140. The second content may be data, which is obtained by the photographing device 130 by capturing images on the display device 120; when there is no error in the display device 120 or the first content, the first content and the second content may be substantially the same as each other. However, when there is an error in the display device 120 or the first content, the first content and the second content may be different from each other. In the specification, the photographing device 130 may also be referred to as a "closed circuit television (CCTV)".

The second server 140 may be connected to the first server 110 by wire or wirelessly. The second server 140 may be positioned together with the first server 110 or may exist in the form of a cloud server. According to an embodiment, the second server 140 may receive the first content from the first server 110.

According to an embodiment, the second server 140 may compare the first content with the second content. When the comparison result indicates that the rate at which the first content coincides with the second content is not less than a specified value, the second server 140 may include the time in which the first content is displayed, in the advertisement playing time. When the rate at which the first content coincides with the second content is less than the specified value, the second server 140 may exclude the time in which the first content is displayed, from the advertisement playing time. As such, the second server 140 may accurately calculate the advertising costs and the content provider may save on incorrectly calculated and unnecessary advertising costs.

According to an embodiment, the second server 140 may extract the feature points of the first content and the second content. The second server 140 may identify the locations of the extracted feature points and whether the extracted feature points coincide with each other and may determine whether the locations of the extracted feature points and the extent to which the extracted feature points coincide with each other, are not less than a specified value. When the locations of the extracted feature points and the extent to which the extracted feature points coincide with each other, are not less than the specified value, the second server 140 may include a first content output time in the advertisement playing time. When the locations of the extracted feature points and the extent to which the extracted feature points coincide with each other are less than the specified value, the second server 140 may exclude the first content output time from the advertisement playing time.

According to an embodiment, the second server 140 may identify the similarity between the first content and the second content, through a Structural Similarity Index Method (SSIM). The SSIM may refer to a method of measuring the similarity of an original image to the distortion caused by compression and conversion. When the similarity is not less than a specified value, the second server 140 may include the first content output time in the advertisement playing time. On the other hand, when the similarity is less than the specified value, the second server 140 may exclude the first content output time from the advertisement playing time. 1361 FIG. 3 illustrates a display device according to an embodiment.

Figure 3:
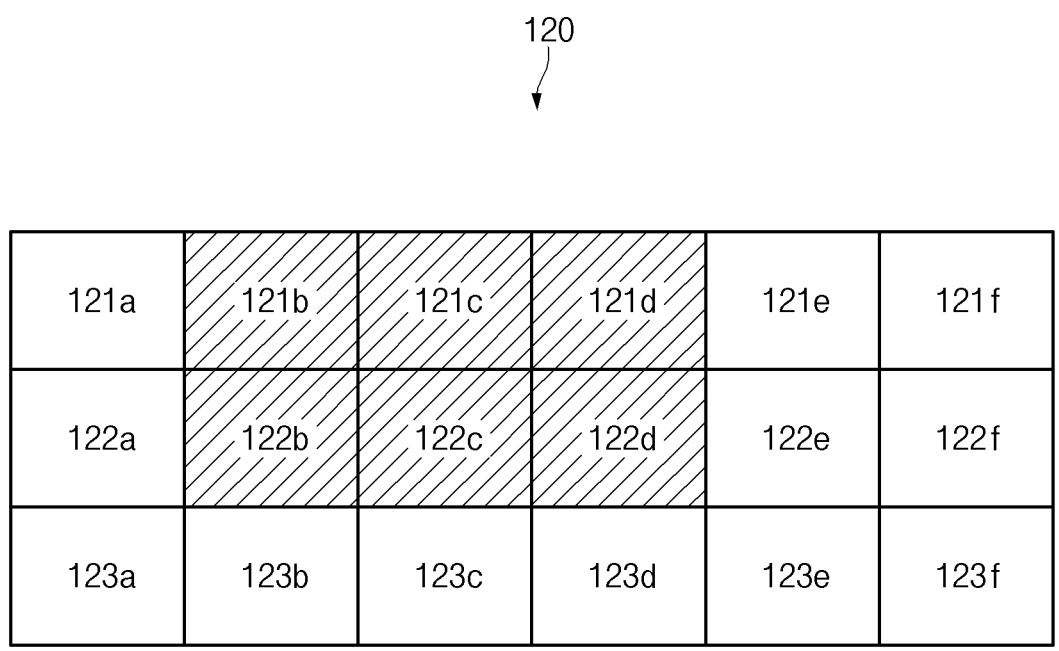
FIG. 3 illustrates a display device according to an embodiment.

Referring to FIG. 3, the display device 120 may include a plurality of displays 121a to 121f, 122a to 122f, and 123a to 123f. For example, the display device 120 may be formed by coupling the 18 displays 121a to 121f, 122a to 122f, and 123a to 123f. An embodiment is exemplified in FIG. 3 as the display device 120 includes the 18 displays 121a to 121f, 122a to 122f, and 123a to 123f. However, the display device 120 may be formed by coupling 18 or more displays. In this specification, the display device 120 may be referred to as a "large-sized display".

Each of the displays 121a to 121f, 122a to 122f, and 123a to 123f may display a part of first content. For example, the screens displayed by the respective displays 121a to 121f, 122a to 122f, and 123a to 123f may form the first content. According to an embodiment, when a fault occurs in at least one of the displays 121a to 121f, 122a to 122f, and 123a to 123f, the part of the first content may not be displayed in the display with the fault. As such, the first content may be different from the second content; the second server 140 may calculate the advertisement playing time based on the rate at which the first content coincides with the second content.

For example, when a fault occurs in the first display 121b, the second display 121c, the third display 121d, the fourth display 122b, the fifth display 122c, and the sixth display 122d, the rate at which the first content coincides with the second content may be less than a specified value. In this case, the second server 140 may exclude the time in which the first content is displayed, from the advertisement playing time.

In another embodiment, when a fault occurs in only the first display 121b, the rate at which the first content coincides with the second content may not be less than the specified value. In this case, the second server 140 may include the time in which the first content is displayed, in the advertisement playing time.

An embodiment is exemplified in FIG. 3 as the display device 120 includes the plurality of displays 121a to 121f, 122a to 122f, and 123a to 123f. However, the display device 120 may consist of a single large-sized display.

Figure 4:
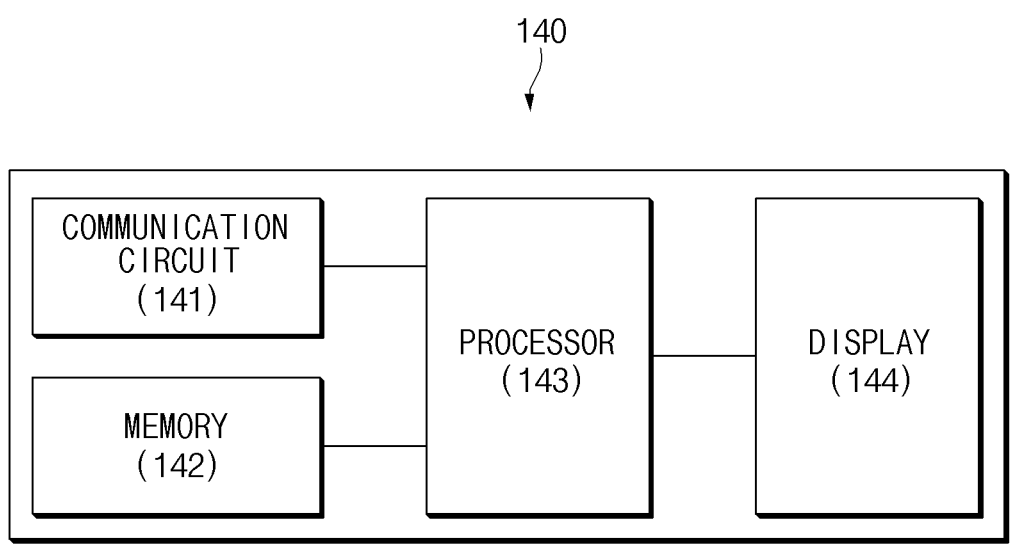
FIG. 4 illustrates a block diagram of a second server according to an embodiment.

FIG. 4 illustrates a block diagram of the second server 140 according to an embodiment. FIG. 4 is a block diagram of hardware components included in the second server 140 illustrated in FIG. 2.

Referring to FIG. 4, the second server 140 may include a communication circuit 141, a memory 142, a processor 143, and a display 144.

The communication circuit 141 may receive first content from the first server 110 and may receive second content from the photographing device 130.

The memory 142 may store the first content and/or the second content.

The processor 143 may compare the first content with the second content; the processor 143 may measure a time when a region where the rate at which the first content coincides with the second content is not less than a specified value is displayed through the display 144. The processor 143 may include the measured time in an advertisement playing time and may calculate advertising costs based on the advertisement playing time. The advertising costs may be proportional to the advertisement playing time.

According to an embodiment, the processor 143 may extract feature points of the first content and the second content. The processor 143 may identify the locations of the extracted feature points and whether the extracted feature points coincide with each other and may determine whether the locations of the extracted feature points and the extent to which the extracted feature points coincide with each other, are not less than a specified value. When the locations of the extracted feature points and the extent to which the extracted feature points coincide with each other, are not less than the specified value, the processor 143 may include a first content output time in the advertisement playing time. When the locations of the extracted feature points and the extent to which the extracted feature points coincide with each other are less than the specified value, the processor 143 may exclude the first content output time from the advertisement playing time.

According to an embodiment, the processor 143 may identify the similarity between the first content and the second content, through an SSIM.

The SSIM may refer to a method of measuring the similarity of an original image to the distortion caused by compression and conversion. When the similarity is not less than a specified value, the processor 143 may include the first content output time in the advertisement playing time. On the other hand, when the similarity is less than the specified value, the processor 143 may exclude the first content output time from the advertisement playing time.

According to an embodiment, the first content may include a first frame group; the second content may include a second frame group. The processor 143 may compare the first frame group with the second frame group for each frame and may measure the rate at which the first content coincides with the second content.

The display 144 may display the advertisement playing time and the advertising costs, which are calculated by the processor 143. For example, when the display system 100 is installed in the stadium 200, a stadium operator may charge the advertising costs to a content provider based on the advertisement playing time and the advertising costs may be displayed on the display 144.

According to an embodiment, the advertisement playing time and the advertising costs may be also displayed through the first server 110. For example, the first server 110 may include a display; the advertisement playing time and the advertising costs may be also displayed through the display included in the first server 110. In this specification, the first server 110 and the second server 140 may be illustrated in separate configurations but may be the same configuration.

Figure 5:
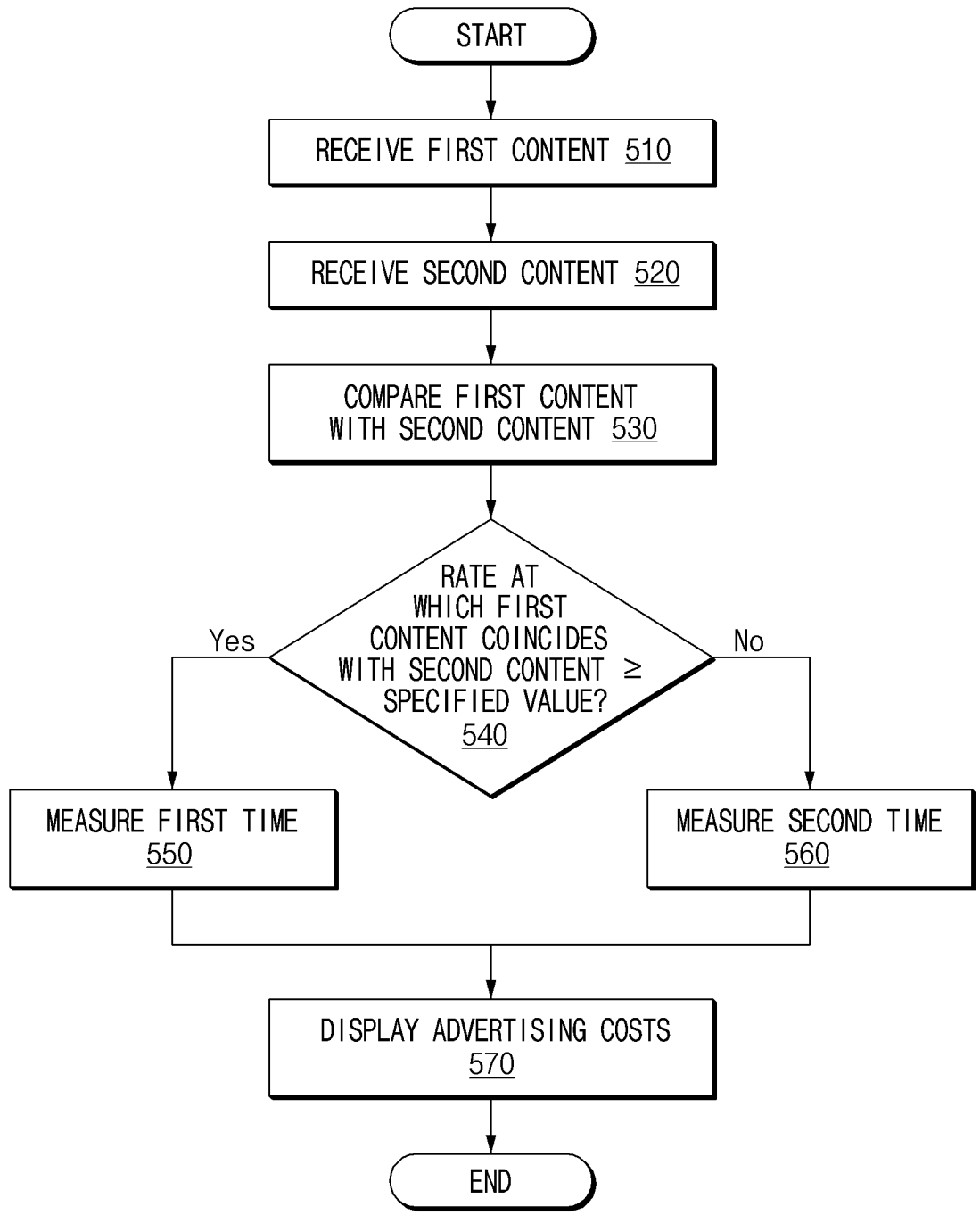
FIG. 5 illustrates an operation flowchart of a second server according to an embodiment.

FIG. 5 is an operation flowchart of a second server according to an embodiment. FIG. 5 illustrates a diagram for describing, in detail, the sequence of operations of the second server 140 illustrated in FIG. 4.

Referring to FIG. 5, in operation 510, the second server 140 may receive first content from the first server 110. The first content received from the first server 110 may be stored in the memory 142.

In operation 520, the second server 140 may receive second content from the photographing device 130. Furthermore, the second content may be stored in the memory 142.

In operation 530, the second server 140 may compare the first content with the second content. For example, the second server 140 may extract the feature points of the first content and the second content. The second server 140 may compare the locations of the feature points of the first content and the second content and whether the feature points coincide with each other.

In operation 540, the second server 140 may determine whether the rate at which the first content coincides with the second content is not less than a specified value. For example, the second server 140 may determine whether the locations of the feature points of the first content and the second content and whether the feature points coincide with each other are not less than a specified value.

In operation 550, the second server 140 may measure a first time, when the rate at which the first content coincides with the second content is not less than the specified value. The first time may mean a time when a region where the rate at which the second content coincides with the first content is not less than a specified value is displayed through the display device 120.

In operation 560, the second server 140 may measure a second time, when the rate at which the first content coincides with the second content is less than the specified value. The second time may mean a time when a region where the rate at which the second content coincides with the first content is less than the specified value is displayed through the display device 120.

In operation 570, the second server 140 may calculate advertising costs based on the first time and/or the second time. For example, the second server 140 may include the first time in the advertisement playing time and may exclude the second time from the advertisement playing time. The second server 140 may calculate advertising costs in proportion to the advertisement playing time and may display the calculated advertising costs through the display 144.

The embodiment illustrated in FIG. 5 is only an embodiment, and various embodiments disclosed in the specification are not limited to the illustration of FIG. 5. For example, an embodiment is exemplified in FIG. 5 as the second server 140 calculates the advertisement playing time based on the first time and the second time. However, the second server 140 may calculate the advertisement playing time based on one of the first time and the second time.

Figure 6:
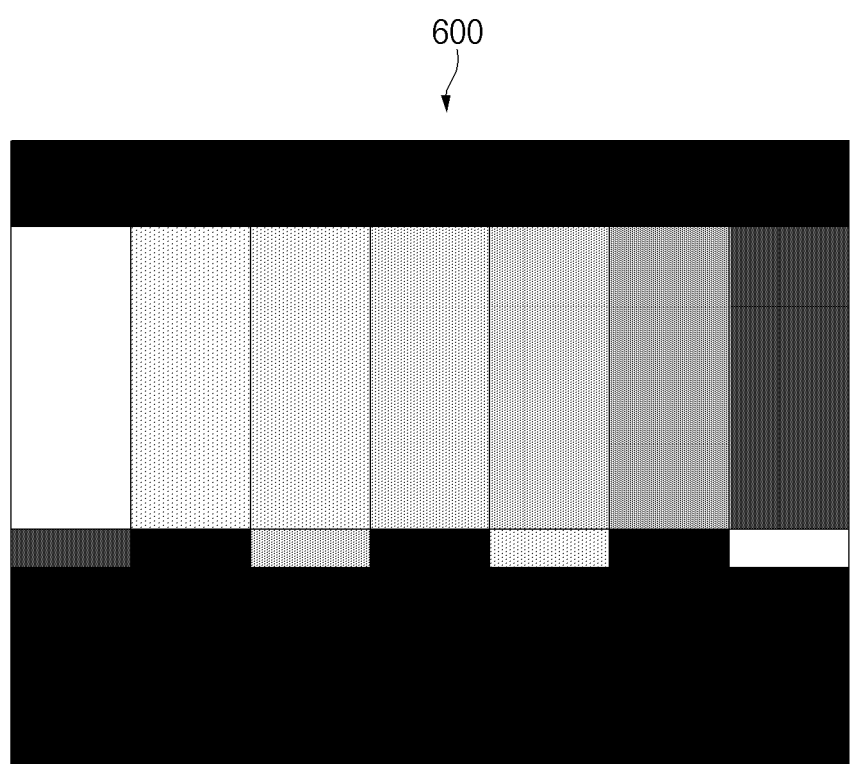
FIG. 6 illustrates second content according to an embodiment.

FIG. 6 illustrates second content according to an embodiment. FIG. 6 is a view for describing the case where a rate at which first content coincides with second content is less than a specified value.

Referring to FIG. 6, the display device 120 may display the first content. However, the first content may not be displayed as it is due to the defect of the display device 120, communication defect, the error of the first content, or the like. For example, as illustrated in FIG. 6, a null screen 600 may be displayed instead of the first content; the photographing device 130 may capture the null screen 600.

The second server 140 may receive the second content from the photographing device 130. In FIG. 6, because the null screen 600 is captured, the photographing device 130 may transmit the null screen 600 to the second server 140.

According to an embodiment, the second server 140 may compare the first content with the second content. When the comparison result indicates that the rate at which the first content coincides with the second content is not less than a specified value, the second server 140 may include the time in which the first content is displayed, in the advertisement playing time. When the rate at which the first content coincides with the second content is less than the specified value, the second server 140 may exclude the time in which the first content is displayed, from the advertisement playing time. In FIG. 6, as a null screen 600 is displayed, the rate at which the first content coincides with the second content may be less than a specified value. As such, the second server 140 may exclude the time in which the null screen 600 is displayed, from the advertisement playing time.

Figure 7:
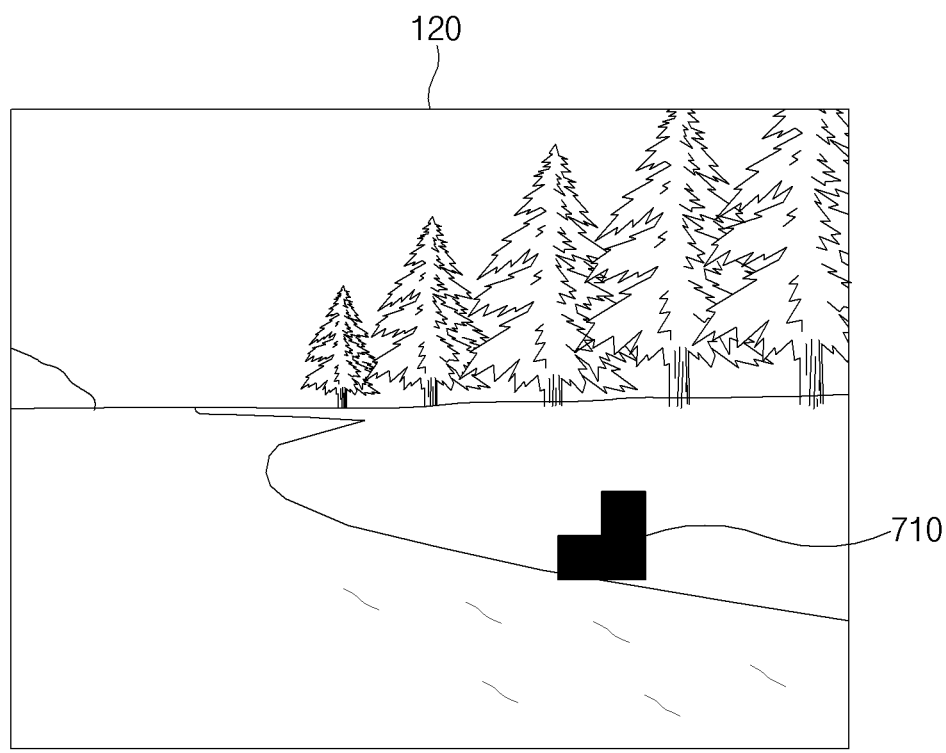
FIG. 7 illustrates second content according to another embodiment.

FIG. 7 illustrates second content according to another embodiment. FIG. 7 is a view for describing the case where a rate at which first content coincides with second content is not less than a specified value.

Referring to FIG. 7, the display device 120 may display the first content. However, a partial region 710 in the first content may not be displayed due to the faults of some displays (e.g., 121*b* of FIG. 3). For example, as illustrated in FIG. 7, a black image may be displayed in the partial region 710; the photographing device 130 may capture the first content including the black image.

The second server 140 may receive the second content from the photographing device 130. In FIG. 7, the first content including the black image may be captured; the photographing device 130 may transmit the captured first content (or the second content) to the second server 140.

According to an embodiment, the second server 140 may compare the first content with the second content. When the comparison result indicates that the rate at which the first content coincides with the second content is not less than a specified value, the second server 140 may include the time when the first content is displayed, in the advertisement playing time. When the rate at which the first content coincides with the second content is less than the specified value, the second server 140 may exclude the time when the first content is displayed, from the advertisement playing time. In FIG. 7, because the black image is displayed in only the partial region 710, the rate at which the first content coincides with the second content may be not less than a specified value. As such, the second server 140 may include the time in which the first content including the black image is displayed, in the advertisement playing time.

Figure 8A:
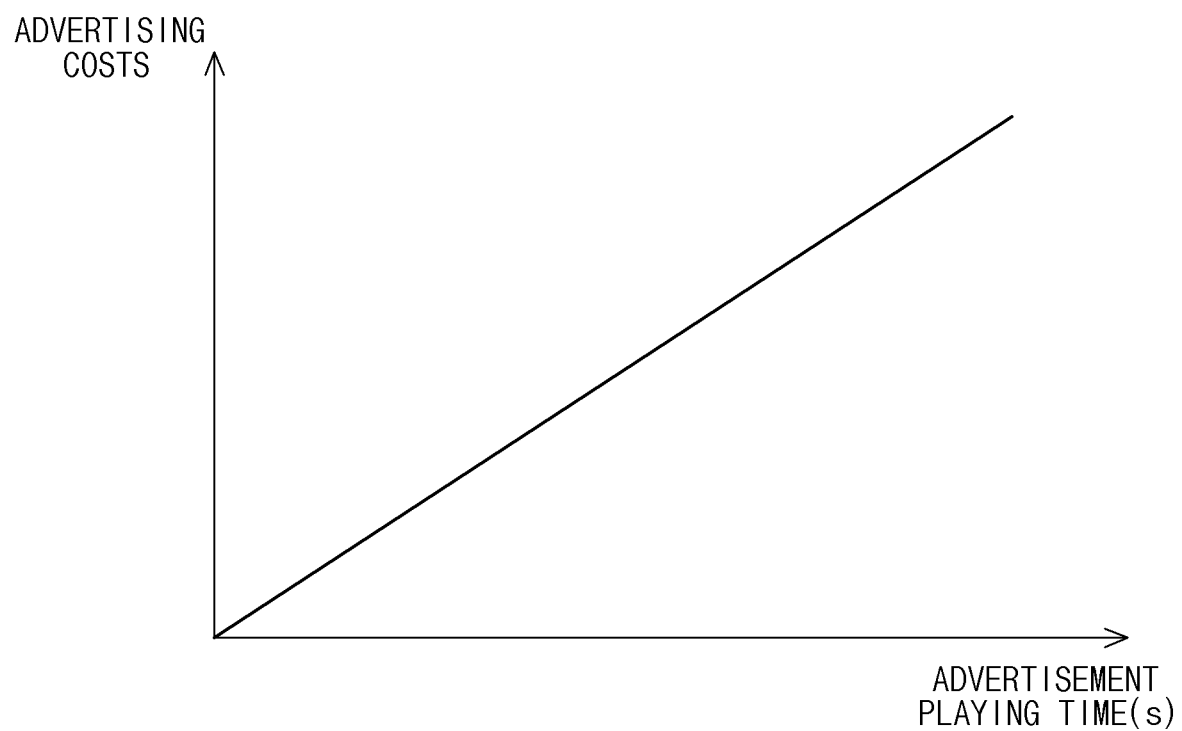
FIG. 8A illustrates advertising costs according to an embodiment.
Figure 8B:
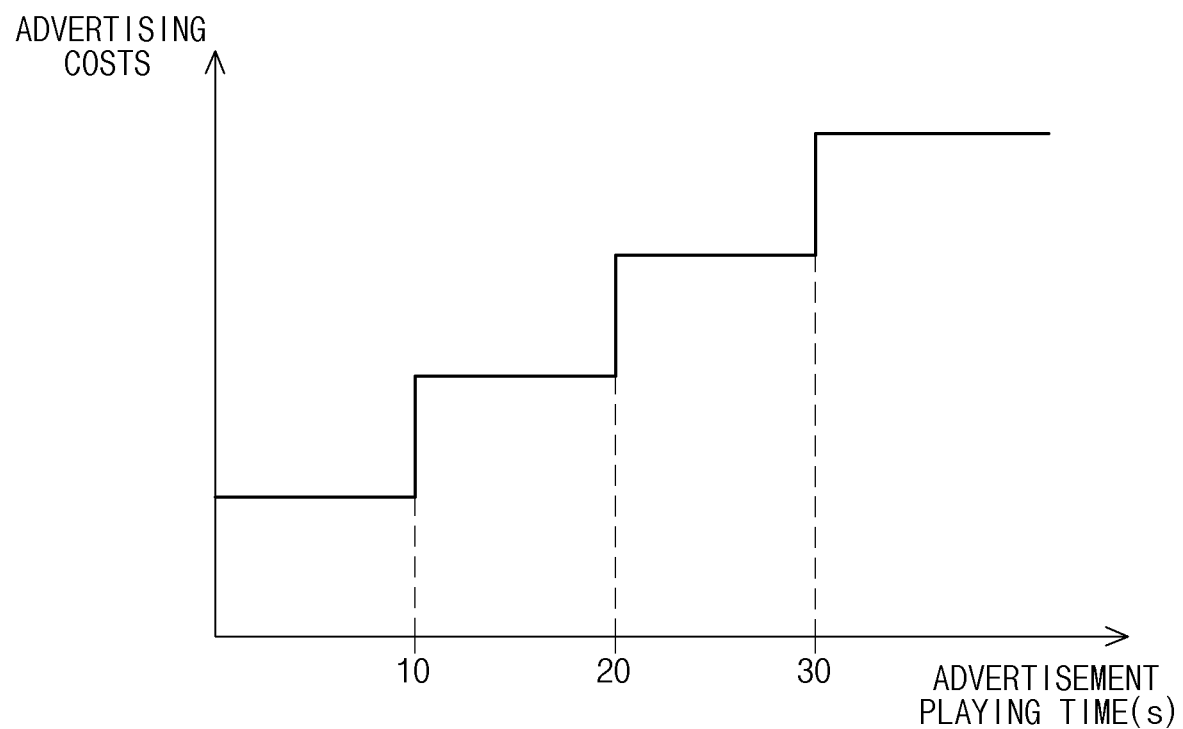
FIG. 8B illustrates advertising costs according to another embodiment.

FIG. 8A illustrates advertising costs according to an embodiment. FIG. 8B illustrates advertising costs according to another embodiment.

Referring to FIG. 8A, advertising costs may increase in proportion to an advertisement playing time. For example, the advertising costs may be 100,000 won/sec; when the advertisement is displayed for 1 minute, the advertising costs may be 6,000,000 won.

Referring to FIG. 8B, the advertising costs may increase stepwise. For example, the advertising costs may be settled in units of 10 seconds; when the advertisement playing time is between 0 seconds and 10 seconds, the advertising costs may be 1,000,000 won; when the advertisement playing time is between 10 seconds and 20 seconds, the advertising costs may be 2,000,000 won.

The embodiments illustrated in FIGS. 8A and 8B are exemplary, and embodiments disclosed in the specification are not limited to FIGS. 8A and 8B. For example, the advertising costs may vary depending on the contract between a content provider and a stadium operator; the advertising costs may be costs fixed regardless of the advertisement playing time.

According to an embodiment disclosed in the specification, a display system may include a display device, a first server transmitting first content to the display device, a second server receiving the first content from the first server, and a photographing device transmitting second content obtained by capturing the display device, to the second server. The second server may be configured to determine whether a rate at which the first content coincides with the second content is not less than a specified value, by comparing the first content with the second content, to measure a first time when a region where a rate at which the first content coincides with the second content is not less than the specified value is displayed through the display device, and to calculate advertising costs based on the first time to display the advertising costs through a display included in the first server or the second server.

According to an embodiment disclosed in the specification, the second server may calculate the advertising costs in proportion to the first time and may display the advertising costs through a display included in the second server.

According to an embodiment disclosed in the specification, the second server may measure a second time when a region where a rate at which the first content coincides with the second content is less than the specified value is displayed through the display device and may exclude the second time from a procedure of calculating the advertising costs.

According to an embodiment disclosed in the specification, the second server may calculate the rate by comparing a feature point of the first content with a feature point of the second content.

According to an embodiment disclosed in the specification, the first content may include a first frame group. The second content may include a second frame group. The second server may measure the first time by comparing the first frame group with the second frame group in units of frames.

According to an embodiment disclosed in the specification, the second server may determine whether a rate at which the first content coincides with the second content is not less than the specified value, through a Structural Similarity Index Method (SSIM).

According to an embodiment disclosed in the specification, the display device may include a plurality of displays, and images displayed by the respective plurality of displays may form the second content.

According to an embodiment disclosed in the specification, the second server may determine that a rate at which the first content coincides with the second content is not less than the specified value when the number of displays displaying the first content among the plurality of displays is not less than a specified number.

According to an embodiment disclosed in the specification, the second server may determine that a rate at which the first content coincides with the second content is less than the specified value when the number of displays displaying the first content among the plurality of displays is less than a specified number.

According to an embodiment disclosed in the specification, the number of the plurality of displays is not less than 18.

According to an embodiment disclosed in the specification, a server may include a display, a communication circuit receiving first content from an external server, a memory storing the first content, and a processor operatively connected to the display, the communication circuit, and the memory. The processor may be configured to determine whether a rate at which the first content coincides with the second content is not less than a specified value, by comparing the first content with the second content when the communication circuit receives second content, which is obtained by an external photographing device by capturing an external display device, from the external photographing device, to measure a first time when a region where a rate at which the first content coincides with the second content is not less than the specified value is displayed through the external display device, and to calculate advertising costs based on the first time to display the advertising costs through the display.

According to an embodiment disclosed in the specification, the processor may calculate the advertising costs in proportion to the first time to display the advertising costs through the display.

According to an embodiment disclosed in the specification, the processor may measure a second time when a region where a rate at which the first content coincides with the second content is less than the specified value is displayed through the external display device and may exclude the second time from a procedure of calculating the advertising costs.

According to an embodiment disclosed in the specification, the processor may calculate the rate by comparing a feature point of the first content with a feature point of the second content.

According to an embodiment disclosed in the specification, the first content may include a first frame group. The second content may include a second frame group. The processor may measure the first time by comparing the first frame group with the second frame group in units of frames.

According to an embodiment disclosed in the specification, the processor may determine whether a rate at which the first content coincides with the second content is not less than the specified value, through a Structural Similarity Index Method (SSIM).

According to an embodiment disclosed in the specification, a method of calculating advertising costs may include receiving first content from a server, receiving second content obtained by a photographing device by capturing a display device, determining whether a rate at which the first content coincides with the second content is not less than a specified value, by comparing the first content with the second content, measuring a first time when a region where a rate at which the first content coincides with the second content is not less than the specified value is displayed through the display device, and calculating advertising costs based on the first time to display the advertising costs.

According to an embodiment disclosed in the specification, the calculating of the advertising costs based on the first time to display the advertising costs may further include calculating the advertising costs in proportion to the first time.

According to an embodiment disclosed in the specification, the method may further include measuring a second time when a region where a rate at which the first content coincides with the second content is less than the specified value is displayed through the external display device and excluding the second time from a procedure of calculating the advertising costs.

According to an embodiment disclosed in the specification, the method may further include calculating the rate by comparing a feature point of the first content with a feature point of the second content.

The display device according to various embodiments disclosed in the disclosure may be various types of devices. The display device may include, for example, a TV, a portable communication device (e.g., a smartphone), a computer device, a portable multimedia device, a mobile medical appliance, a camera, a wearable device, or a home appliance. The display device according to an embodiment of the disclosure should not be limited to the above-mentioned devices.

Various embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context.

In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

The term "module" used herein may include a unit, which is implemented with hardware, software, or firmware, and may be interchangeably used with the terms "logic", "logical block", "part", "circuit", or the like. The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the disclosure may be implemented with software including one or more instructions stored in a storage medium or an external memory readable by a machine. For example, the processor of the machine may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStorem), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to various embodiments, each component (e.g., a module or a program) of the above-described components may include a single entity or a plurality of entities. According to various embodiments, one or more the components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, program, or other components may be executed by a successive method, a parallel method, a repeated method, or a heuristic method, or one or more of the operations may be executed in different sequences or omitted. Alternatively, one or more other operations may be added.

The invention claimed is:

1. A display system comprising:
   a display;
   a first server configured to transmit first content to the display;
   a second server configured to receive the first content from the first server; and
   a camera configured to transmit second content obtained by capturing a full screen of the display, to the second server, the second server being configured to:
   extract first feature points of the first content and second feature points of the second content;
   identify locations of the first feature points and locations of the second feature points, and whether each of the first feature points coincides with corresponding ones of the second feature points;
   determine whether a rate at which the first content from the first server coincides with the second content corresponding to the captured images of the display, is greater than or equal to a specified value, by determining whether the locations of the first feature points coincide with the location of the second feature points, and whether an extent to which the first feature points coincide with the second feature points is greater than or equal to the specified value;
   measure a first time period during which a region of the images displayed on the display and corresponding to the first content, coincides with the second content at a rate which is greater than or equal to the specified value; and
   calculate advertising costs based on the measured first time period and display the calculated advertising costs through a server display included in the first server or the second server.

2. The display system of claim 1, wherein the second server is further configured to calculate the advertising costs in proportion to the first time period and display the calculated advertising costs through the server display included in the second server.

3. The display system of claim 1, wherein the second server is further configured to measure a second time period during which the region of the images displayed on the display and corresponding to the first content, coincides with the second content at a rate which is less than the specified value, and excludes the second time period from a the calculation of the advertising costs.

4. The display system of claim 1, wherein the first content includes a first frame group,
wherein the second content includes a second frame group, and
wherein the second server measures the first time period by comparing the first frame group with the second frame group in units of frames.

5. The display system of claim 1, wherein the second server is further configured to determine whether the rate at which the first content coincides with the second content is greater than or equal to the specified value, through a Structural Similarity Index Method (SSIM).

6. The display system of claim 1, wherein the display includes a plurality of displays, and
wherein images displayed by the respective plurality of displays form the images on the display captured by the camera to transmit the second content.

7. The display system of claim 6, wherein the second server is further configured to determine that the rate at which the first content coincides with the second content is greater than or equal to the specified value, based on the number of displays displaying the first content among the plurality of displays being greater than or equal to a specified number.

8. The display system of claim 6, wherein the second server is further configured to determine that the rate at which the first content coincides with the second content is less than the specified value based on the number of displays displaying the first content among the plurality of displays being less than a specified number.

9. The display system of claim 6, wherein the number of the plurality of displays is greater than or equal to 18.

10. A server comprising:
a display;
a communication circuit configured to receive first content from an external server;
a memory configured to store the first content; and
a processor operatively connected to the display, the communication circuit, and the memory, the processor being configured to:
based on the communication circuit receiving second content from an external camera which captures a full screen of an external display, extract first feature points of the first content and second feature points of the second content;
identify locations of the first feature points and locations of the second feature points, and whether each of the first feature points coincides with corresponding ones of the second feature points;
determine whether a rate at which the first content from the first server coincides with the second content corresponding to the captured images of the display is greater than or equal to a specified value, by determining whether the locations of the first feature points coincide with the locations of the second feature points, and whether an extent to which the first feature points coincide with the second feature points is greater than or equal to the specified value;
measure a first time period during which a region of the images displayed on the external display and corresponding to the first content, coincides with the second content at a rate which is greater than or equal to the specified value; and
calculate advertising costs based on the measured first time period and display the calculated advertising costs through the display.

11. The server of claim 10, wherein the processor is further configured to calculate the advertising costs in proportion to the first time period to display the calculated advertising costs through the display.

12. The server of claim 10, wherein the processor is further configured to measure a second time period during which the region of the images displayed on the external display and corresponding to the first content, coincides with the second content at a rate which is less than the specified value, and excludes the second time period from the calculation of the advertising costs.

13. The server of claim 10, wherein the first content includes a first frame group,
wherein the second content includes a second frame group, and
wherein the processor measures the first time period by comparing the first frame group with the second frame group in units of frames.

14. The server of claim 10, wherein the processor is further configured to determine whether the rate at which the first content coincides with the second content is greater than or equal to the specified value, through a Structural Similarity Index Method (SSIM).

15. A method of calculating advertising costs, the method comprising:
receiving first content from a server;
receiving second content obtained by a camera which captures a full screen of a display;
extracting first feature points of the first content and second feature points of the second content;
identifying locations of the first feature points and locations of the second feature points, and whether the first feature points coincide with the second feature points;
determining whether a rate at which the first content from the server coincides with the second content corresponding to the captured images of the display, is greater than or equal to a specified value, by determining whether the locations of the first feature points coincide with the locations of the second feature points, and whether an extent to which the first feature points coincide with the second feature points is greater than or equal to the specified value;
measuring a first time period during which a region of the images displayed on the display and corresponding to the first content, coincides with the second content at a rate which is greater than or equal to the specified value; and
calculating advertising costs based on the measured first time period and to display the calculated advertising costs.

16. The method of claim 15, wherein the calculating of the advertising costs based on the measured first time period further includes:
calculating the advertising costs in proportion to the first time period.

17. The method of claim 15, further comprising:
measuring a second time period during which the region of the images displayed on the display and corresponding to the first content, coincides with the second content at a rate which is less than the specified value; and
excluding the second time period from the calculating the advertising costs.

* * * * *